United States Patent
Weinberg et al.

(10) Patent No.: US 7,567,922 B1
(45) Date of Patent: Jul. 28, 2009

(54) METHOD AND SYSTEM FOR GENERATING A NORMALIZED CONFIGURATION MODEL

(75) Inventors: Michael E. Weinberg, Austin, TX (US); David F. Meeker, Austin, TX (US); Grant M. Emery, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 0 days.

(21) Appl. No.: 10/924,630

(22) Filed: Aug. 24, 2004

Related U.S. Application Data

(60) Provisional application No. 60/601,089, filed on Aug. 12, 2004.

(51) Int. Cl.
    *G06Q 30/00* (2006.01)
(52) U.S. Cl. .................... 705/26; 705/27; 705/1
(58) Field of Classification Search .......... 705/26, 705/27, 1
    See application file for complete search history.

(56) References Cited

U.S. PATENT DOCUMENTS

| | | | |
|---|---|---|---|
| 5,515,524 A | 5/1996 | Lynch et al. | |
| 5,550,746 A | 8/1996 | Jacobs | 700/231 |
| 5,655,085 A | 8/1997 | Ryan et al. | |
| 5,708,798 A | 1/1998 | Lynch et al. | |
| 5,825,651 A | 10/1998 | Gupta et al. | |
| 6,002,854 A | 12/1999 | Lynch et al. | |
| 6,405,308 B1 | 6/2002 | Gupta et al. | |
| 6,430,730 B1 | 8/2002 | Ghatate et al. | 716/4 |
| 6,675,294 B1 | 1/2004 | Gupta et al. | |
| 6,718,535 B1* | 4/2004 | Underwood | 717/101 |
| 7,043,407 B2* | 5/2006 | Lynch et al. | 703/1 |
| 7,337,179 B1 | 2/2008 | Plain | |
| 2002/0026373 A1* | 2/2002 | Kamath et al. | 705/26 |
| 2002/0073001 A1* | 6/2002 | Palmer et al. | 705/29 |
| 2002/0073138 A1 | 6/2002 | Gilbert et al. | |
| 2002/0087432 A1* | 7/2002 | Muniz | 705/27 |
| 2002/0143653 A1 | 10/2002 | DiLena et al. | 705/26 |
| 2002/0165701 A1 | 11/2002 | Lichtenberg et al. | 703/7 |
| 2004/0012634 A1 | 1/2004 | Kraemer et al. | 345/771 |
| 2005/0102199 A1* | 5/2005 | Lee | 705/27 |
| 2005/0197926 A1* | 9/2005 | Chinnappan et al. | 705/27 |

OTHER PUBLICATIONS

J. Tiihonen et al., "Modeling Configurable Product Families," 4th WDK Workshop on Product Structuring, Oct. 22-23, 1998, http://www.soberit.hut.fi/pdmg/papers/TLSP98.PDF, 22 pages.

* cited by examiner

*Primary Examiner*—Jeffrey A. Smith
*Assistant Examiner*—Michael A. Misiaszek
(74) *Attorney, Agent, or Firm*—Hamilton & Terrile LLP; Kent B. Chambers

(57) ABSTRACT

Normalized data models are programmatically generated from a combination of product configuration model data, product configuration engine runtime validation, normalized data mappings, and settings files declaring the scope of model content. A master model generation process effectively transforms conventional configuration data into normalized configuration data. The normalized configuration data allows a user to, for example, conduct comparative product configurations. In one embodiment, a normalized model generation process generates normalized data model representing attributes and normalized features of a product. In one embodiment, the normalized configuration data model is then added to in-memory data structures used during runtime contextual configuration analysis, thus reducing the total number of data items preserved as efficiencies result from eliminating duplication and effective use of search structures. In-memory representation of the normalized configuration data model can then be serialized to disk as a file to be loaded for runtime use in a deployment.

29 Claims, 7 Drawing Sheets

METHOD AND SYSTEM FOR GENERATING A NORMALIZED CONFIGURATION MODEL

CROSS-REFERENCE TO RELATED APPLICATION

This application claims the benefit under 35 U.S.C. § 119(e) of U.S. Provisional Application No. 60/601,089, filed Aug. 12, 2004, and entitled "Normalized Model Generation."

This application claims the benefit under 35 U.S.C. § 120 of commonly assigned U.S. patent application Ser. No. 10/871,849, entitled "Display of Product Configuration Contexts with Selectable Configuration Constraints", filed Jun. 18, 2004, and inventor Andrew F. Miller (referred to herein as the "Miller Application"). The Miller Application is hereby incorporated by reference in its entirety.

BACKGROUND OF THE INVENTION

1. Field of the Invention

The present invention relates in general to the field of information processing, and more specifically to a system and method for generating normalized data models.

2. Description of the Related Art

The use of networked data processing systems to market and sell products continues to grow. Such systems are sometimes referred to as electronic commerce systems. When an e-commerce system offers many products and many variations of the same product, effectively and efficiently guiding a user to a product that best matches the user's interest poses a complicated problem.

Data models have been developed that describe products in terms of feature families, features of families, and feature attribute values. Configurable products can be described by sets of selectable features that make up the product. A feature represents an option that can be ordered on a product. For convenience, selectable features are generally grouped by families. Families are typically classified as groups of features with the same functional purpose. Example families for an automobile are "version," "trim package," "exterior package," "drives," "engines," "series," "tires," "markets," "wheels," "seats," and "transmissions." An example feature from the engines family is a "4.5 liter V8." Features relate to each other via configuration rules.

Many Internet sites allow users to configure products by selecting a product, selecting a family, and then selecting attribute values for available features. The families and features are product specific. Thus, most configuration engines access a product specific configuration data model.

However, contextual product configuration systems allow a user to enter contextual configuration parameters that span across products. The Miller Application describes example embodiments of such a contextual product configuration display system. Product specific configuration data models often contain unique feature family, feature, and attribute references that impair the ability of a configuration engine to create configuration contexts that span across products. For example, a Product A configuration model may contain two possible engines, the 3.5 L V6 PowerTech and the 2.9 L V6 CruiseTech. A Product B configuration model may also contain two possible engines, the 4.8 L V8 HyperDrive and the 2.8 L V6 EfficiencyDrive. The nomenclature for all the engines is different, thus, making an automated contextual configuration very difficult.

SUMMARY OF THE INVENTION

To provide configuration context across multiple products, product families and features are normalized. Embodiments of the present invention described herein provide a process and system for generating normalized product data models. The normalized product data models can be accessed by a contextual product configuration system to provide configuration data that spans across products.

In one embodiment of the present invention, a method for generating a normalized configuration model includes mapping specific product feature references to normalized product feature references into a mapping file, generating product configuration instances from one or more product configuration models that include non-normalized feature references, and identifying non-normalized feature references included in one or more of the product configuration instances. The method further includes accessing the mapping file, locating normalized feature references that correlate with non-normalized feature references included in the generated product configuration instances, replacing non-normalized feature references with correlating normalized feature references, and generating a normalized configuration model corresponding to the generated product configuration instances.

In another embodiment of the present invention, a data processing system for generating a normalized configuration mode includes a processor and a memory, coupled to the processor. The memory includes code encoded therein and executable by the processor to:

map specific product feature references to normalized product feature references into a mapping file;

generate product configuration instances from one or more product configuration models that include non-normalized feature references;

identify non-normalized feature references included in one or more of the product configuration instances;

access the mapping file;

locate normalized feature references that correlate with non-normalized feature references included in the generated product configuration instances;

replace non-normalized feature references with correlating normalized feature references; and generate a normalized configuration model corresponding to the generated product configuration instances.

In another embodiment of the present invention, a computer program product includes data encoded therein for generating a normalized configuration model. The data includes code executable by a processor to:

map specific product feature references to normalized product feature references into a mapping file;

generate product configuration instances from one or more product configuration models that include non-normalized feature references;

identify non-normalized feature references included in one or more of the product configuration instances;

access the mapping file;

locate normalized feature references that correlate with non-normalized feature references included in the generated product configuration instances;

replace non-normalized feature references with correlating normalized feature references; and generate a normalized configuration model corresponding to the generated product configuration instances.

In another embodiment of the present invention, a system for generating a normalized configuration data model includes means for mapping specific product feature references to normalized product feature references into a mapping file and means for generating product configuration instances from one or more product configuration models that include non-normalized feature references. The system further includes means for identifying non-normalized feature references included in one or more of the product configuration instances, means for accessing the mapping file, and means for locating normalized feature references that correlate with non-normalized feature references included in the generated product configuration instances. The system also includes means for replacing non-normalized feature references with correlating normalized feature references and means for generating a normalized configuration model corresponding to the generated product configuration instances.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

The term "product" as used herein can refer to products, services, and variations of products such as model variations and trim variations. All prices, product options, product images, and configuration choices are for illustration purposes only.

Normalized data models are programmatically generated from a combination of standard product configuration model data, product configuration engine runtime validation, normalized data mappings, and settings files declaring the scope of model content. A master model generation process effectively transforms conventional configuration data into normalized configuration data. The normalized configuration data allows a user to, for example, conduct comparative product configurations such as the contextual configuration described in the Miller Application. In one embodiment, a normalized model generation process generates a normalized data model representing attributes and normalized features of a product. In one embodiment, the normalized configuration data model is then added to in-memory data structures used during runtime contextual configuration analysis, thus reducing the total number of data items preserved as efficiencies result from eliminating duplication and effective use of search structures. In-memory representation of the normalized configuration data model can then be serialized to disk as a file to be loaded for runtime use in a deployment. Precomputation of the normalized data model can provide significant run-time performance improvements.

Figure 1:
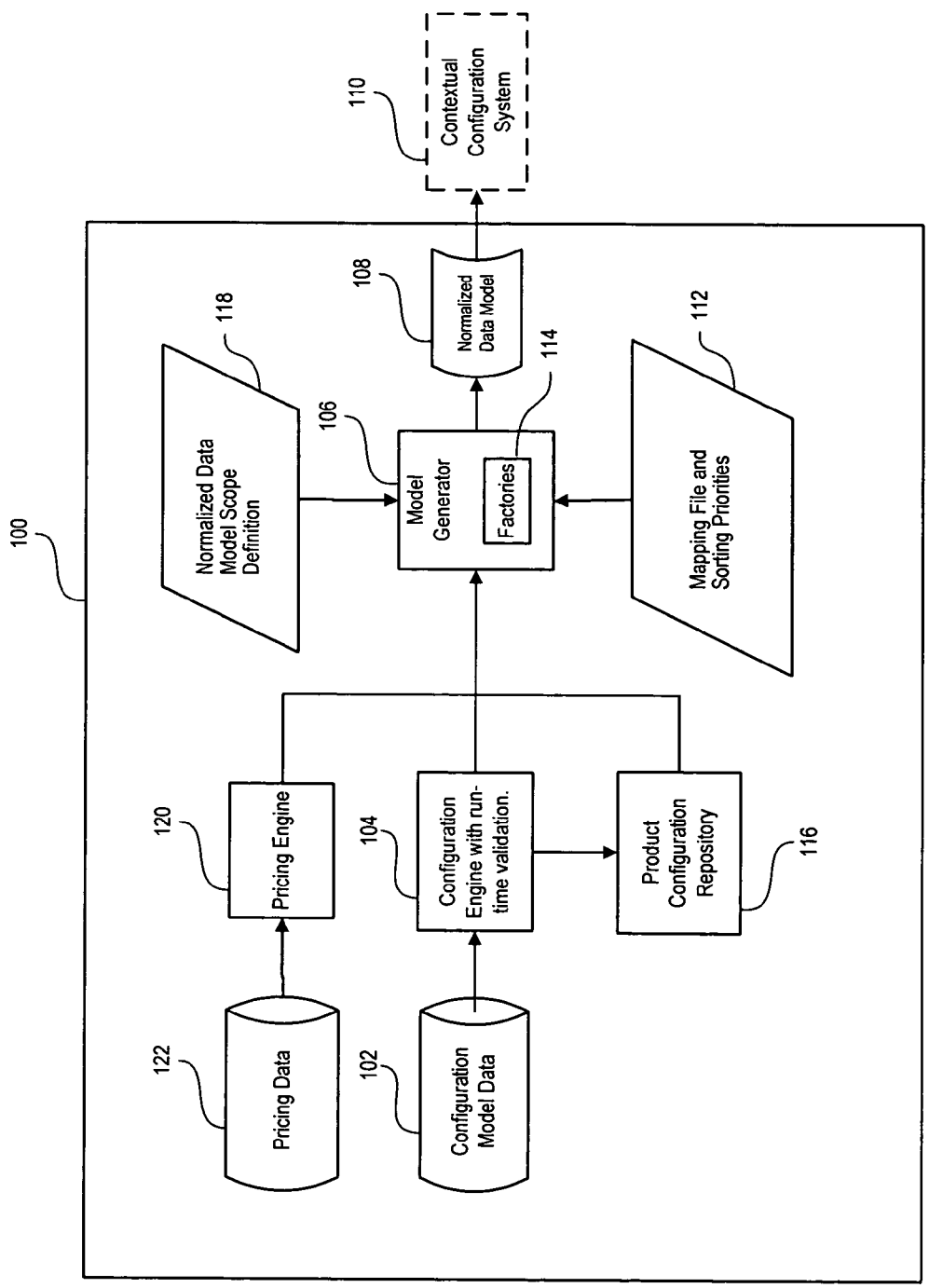
FIG. 1 depicts an embodiment of a normalized configuration model generation system.
Figure 2:
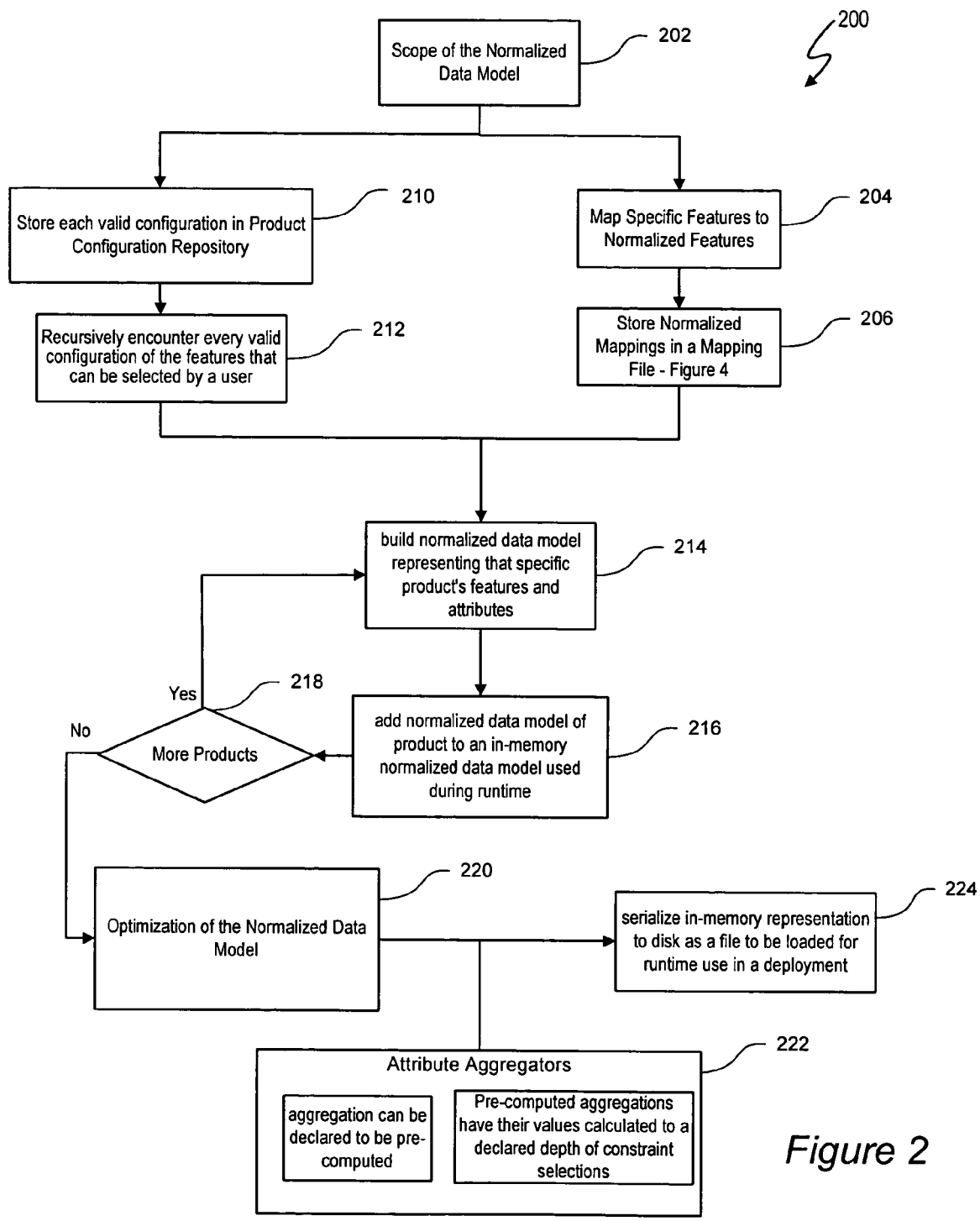
FIG. 2 depicts a normalized model generation process performed by the system of FIG. 1.

FIG. 1 depicts an embodiment of a normalized configuration model generation system 100 that performs the normalized configuration model generation process 200 depicted in FIG. 2. The normalized model generation system 100 generates a normalized data model 108 for a predetermined set of configurable products and for a predetermined set of configuration constraints.

Normalized data models are generally constructed of two types of data: features and attributes. Features represent selectable product features. In an automotive context, a selectable feature is, for example, a specific engine or a price range. Attributes represent a single value from a range that can later be used to aggregate similar values across all products contained in the normalized data model 108. These aggregations provide users with contextual information about a group of products as discussed in the Miller Application.

Attributes are specific values associated with a product instance. For example, a given product may have a maximum towing capacity of 3,000 lbs. or a price of 25,000 dollars. Attribute values for a given product are calculated or encountered during the model generation process 200 and assigned before it is added to the pool of valid products in the normalized data model 108.

The model generator 106 is guided by a normalized data model scope definition file 118 that defines the scope of the normalized data model 108. The normalized data model scope definition file 118, in one embodiment, declares the set of configuration models to be explored for valid products, the factories 114 to be used in defining the products in accordance with feature families and attributes, and aggregation aggregators to be applied to provide aggregate product attribute data. The set of configuration products, the set of configuration constraints, and other user design preferences define the scope of the normalized data model 108. Operation 202 defines the scope of normalized data model 108 and stores the settings in normalized data model scope definition file 118. The normalized model generation process 200 normalizes product features so that, for example, the features of multiple products can be displayed in a contextual configuration as described in the Miller Application.

Operation 204 maps specific features to normalized features. Operation 206 stores the mappings in a mapping file 112. In one embodiment, some features are static—derived from manually defined values or mappings stored in the mapping file 112 that is made available model generator 106 during the normalized configuration model generation process 200. For example, a modeler can establish a feature called "V6" that represents V6 engines on a particular vehicle. By specifically declaring the definition of a feature in the mapping file 112, the feature has been statically determined to exist and has a fixed relationship to the space of available product selections in normalized data model 108. In one embodiment, the mapping file 112 is a manually written extensible markup language (XML) file.

In another example of operations 204 and 206, if a design choice is made to provide an end-user a group of normalized constraints containing the options Cloth Seats, Leather Seats, and No Preference (that is, the selection of Cloth Seats OR Leather Seats), operations 204 and 206 establish a mapping between these "normalized" names for these features and the more complex, specific names given in the configuration model data 102. The model generator 106 includes code for mapping arbitrary strings (in this case, the names of the normalized features) to sets of selections in the product configuration repository 116. For an example vehicle, the following pseudo code represents the applicable portion of the mapping file 112:

```
<Attribute name="Seats">
    <ValueSet value="Leather Seats">
        <Part id="_1ZZZZZOKIAER254SOS1L3NYZB2DN5DMV"/><!-- Leather-Trimmed Sport Bucket Seats (w/6-Way Power Driver 2-Way Adjustable Head Restraints and Manual Driver/Passenger Lumbar Support) -->
    </ValueSet>
    <ValueSet value="Leather Seats">
        <Part id="_1ZZZZZOE4ECS1ITSOS1L3NYZB2DN5DMV"/><!-- Leather-Trimmed Luxury Bucket Seats (w/6-Way Heated Power Driver/Passenger Manual Driver/Passenger Lumbar Support and 3-Position Driver Memory Seat with Easy Entry/Exit Feature) -->
    </ValueSet>
    <ValueSet value="Leather Seats">
        <Part id="_1ZZZZZOXUECS1ITSOS1L3NYZB2DN5DMV"/><!-- Leather-Trimmed Luxury Bucket Seats (w/6-Way Heated Power Driver/Passenger Manual Driver/Passenger Lumbar Support and 3-Position Driver Memory Seat with Easy Entry/Exit Feature) -->
    </ValueSet>
    <ValueSet value="Leather Seats">
        <Part id="_1ZZZZZHTFWWDX51NOS1LFIYZB2DN5DMV"/><!-- Luxury Leather-Trimmed Bucket Seats w/6-Way Power Driver/Passenger Heated Manual Driver/Passenger Lumbar Support 2-Position Driver Seat w/Memory -->
    </ValueSet>
    <ValueSet value="Cloth Seats">
        <Part id="_1ZZZZZLZMKLJQPOEPS1WU4XZZK2VMSRZ"/><!-- Cloth Low Back Bucket Seats (w/2-Way Adjustable Head Restraints) -->
    </ValueSet>
    <ValueSet value="Cloth Seats">
        <Part id="_1ZZZZZSKIAER254SOS1L3NYZB2DN5DMV"/><!-- Cloth Low Back Sport Bucket Seats (w/6-Way Power Driver 2-Way Adjustable Head Restraints and Manual Driver/Passenger Lumbar Support) -->
    </ValueSet>
    <ValueSet value="Cloth Seats">
        <Part id="_1ZZZZZSXUECS1ITSOS1L3NYZB2DN5DMV"/><!-- Cloth Low Back Sport Bucket Seats (w/6-Way Power Driver 2-Way Adjustable Head Restraints and Manual Driver/Passenger Lumbar Support) -->
    </ValueSet>
    <ValueSet value="Cloth Seats">
        <Part id="_1ZZZZZH2FWWDX51NOS1LFIYZB2DN5DMV"/><!-- Cloth Low Back Sport Bucket Seats w/6Way Power Driver Manual Driver/Passenger Lumbar Support -->
    </ValueSet>
    <ValueSet value="Cloth Seats">
        <Part id="_1ZZZZZOFHKUW4DDRES113DYZZB0XE1S4"/><!-- Cloth Low Back Bucket Seats -->
    </ValueSet>
</Attribute>
```

In the above example, the attribute name specifies the family of features displayed by the contextual configuration system 110. There will be only two members of this family, establishing a mutually exclusive relationship where an end-user may choose one and only one of leather seats or cloth seats. Each ValueSet is a mapping between the value (the name of the interactive showroom feature) and a Part (i.e. feature referenced by a unique identifier in the configuration model data 102), the configuration model data 102's representation of a very specific instance of that value. After each Part specification is a comment containing the complete marketing description of that selection in the configuration engine 104.

Thus, the model generator 106 in conjunction with the normalized data model 108 can return the value corresponding to a Part. In essence, the mapping allows the model generator 106 to return "Leather Seats" if the two seats available on a specific vehicle are "Leather-Trimmed Luxury Bucket Seats (w/6-Way Heated Power Driver/Passenger Manual Driver/Passenger Lumbar Support and 3-Position Driver Memory Seat with Easy Entry/Exit Feature)" and "Luxury Leather-Trimmed Bucket Seats w/6-Way Power Driver/Passenger Heated Manual Driver/Passenger Lumbar Support 2-Position Driver Seat w/Memory", the model generator 106 would return Leather Seats. This normalization serves to simplify the language presented to an end-user when using, for example, the contextual configuration system 110 and provides a common feature across models and even across specific options within a model. Thus, in the example above, all four of the very specific configuration Parts called out under Leather Seats ValueSets can actually be understood by an end-user as simply "Leather Seats"—regardless of the details.

Figure 3:
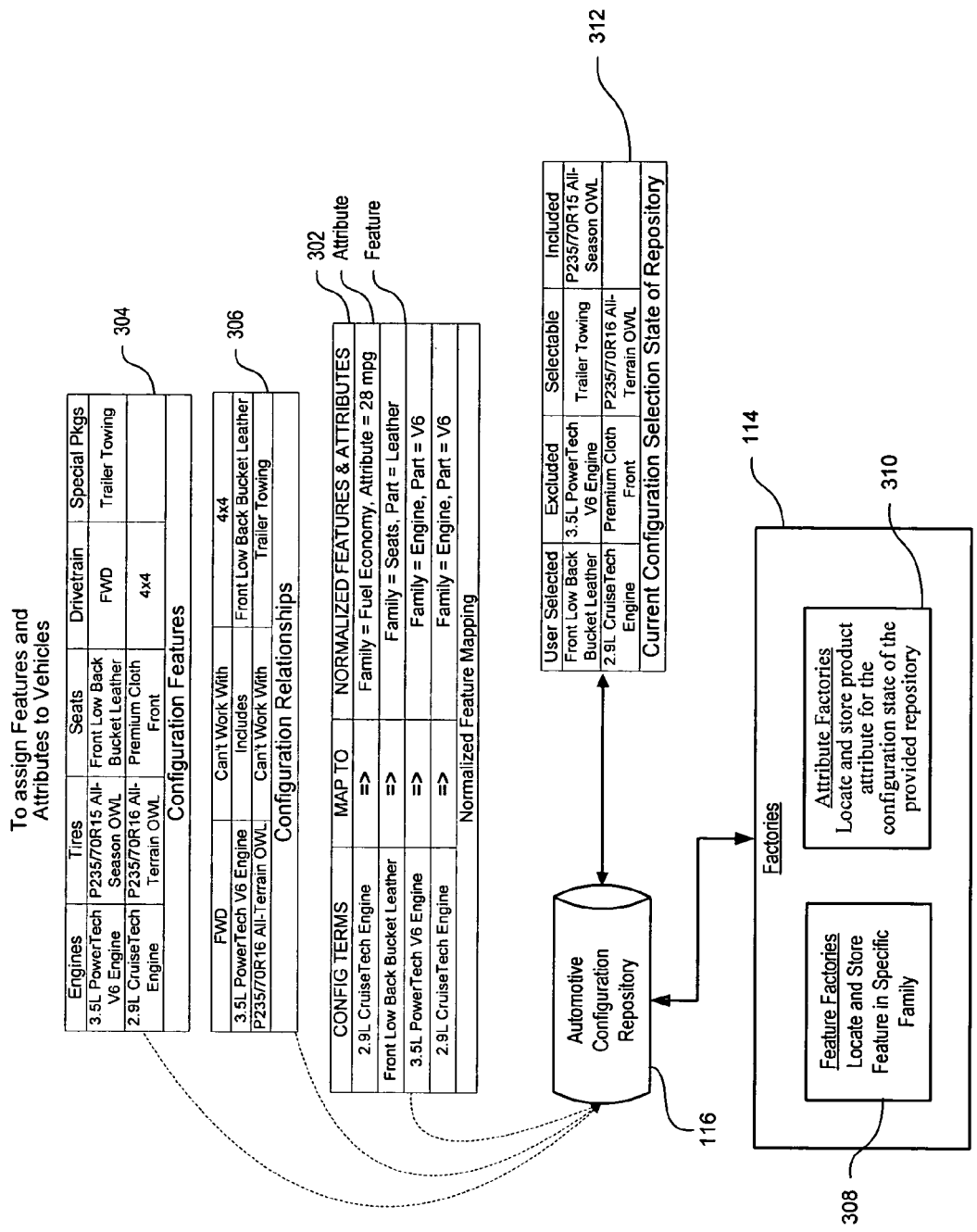
FIG. 3 depicts a product configuration repository and feature and attribute factories.

Referring to FIG. 3, feature mapping table 302 contains a pseudo representation of mapping file 112 with example data. The specific configuration feature 3.5 L PowerTech Engine and 4×4 maps to the feature family=fuel economy with a normalized attribute value of 28 mpg. The specific configuration feature "Front Low Back Bucket Leather" maps to the family=seats and the normalized feature=Leather. The 3.5 L PowerTech V6 Engine and 2.9 L CuriseTech Engine each map to the family=engine and feature=V6.

It is also possible to define features dynamically. Dynamically defined features are created when the model generator 106 encounters a situation where a new feature is requested. For example, if selections for product price ranges are being made available in the normalized data model 108, the normalized model generation system 100 can declare that price range features will be generated dynamically as products with prices in new ranges are encountered. Thus, dynamic features can account for changing values or features (e.g. prices) of a given product or group of products between executions of the normalized model generation process 200.

In one embodiment, the normalized model generation system 100 precomputes normalized data model 108 for each configuration of each product identified in the normalized data model scope definition file 118. The standard configuration data model 102 includes conventional, non-normalized product configuration data for one or more products, and configuration engine 104 can access the configuration model data 102 to generate all possible configurations of a product. Table 304 contains example product configuration features, and table 306 contains example rules that define configuration relationships between various product features. In operation 210, model generator 106 requests the configuration engine 104 to access configuration model data 102 and store the configuration model data in product configuration repository 116. Additionally, specific attributes can be associated with each product configuration. For example, model generator 106 can request pricing engine 120 to determine the price of each valid configuration using pricing data 122. An example pricing engine is disclosed in U.S. Pat. No. 5,878,400 entitled "Method and Apparatus for Pricing Products in Multi-Level Product and Organizational Groups", inventor Thomas J. Carter III and assigned to Trilogy Development Group, Inc. U.S. Pat. No. 5,878,400 is incorporated herein by reference in its entirety. Thus, in one embodiment, the contextual configuration system 110 provides end-users with data other than pure product configuration data. For example, the contextual configuration data system 110 may provide end-users with pricing data, fuel economy data (in an automotive context), or other data relevant to a particular contextual product configuration. In one embodiment, the model generator 106, for example, also requests pricing engine 102 to access pricing data 122 and store the pricing data 122 in product configuration repository 116. In one embodiment, the data stored in product configuration repository 116 includes the rules and features used to generate product configuration instances. In operation 212, model generator 106 loads a configuration engine to recursively encounter every valid configuration of features for each product that can be selected by an end-user of a product configuration web site, such as the web site described in the Miller Application. Normalized data model scope definition file 118 defines the scope of products that can be configured by an end-user. Each valid product configuration represents a single instance of a combined set of attributes and features that can be selected by or presented to an end user of the product configuration web site. U.S. Pat. No. 5,825,651 entitled "Method and Apparatus for Maintaining and Configuring Systems", inventors Gupta et al., and assigned to Trilogy Development Group, Inc. describes an example configuration engine 102 and configuration model data 104. U.S. Pat. No. 5,825,651 is incorporated herein by reference in its entirety.

Once the attribute and normalized feature mapping file 112 is generated and all valid product configurations are stored in the product configuration repository 116, operation 214 builds a normalized data model on a product-by-product basis using software modules referred to as "factories" 114. In one embodiment, a respective feature factory is associated with each family in a configuration hierarchy, and a respective attribute factory is associated with each product attribute. For example, in an automotive context, a "seat" feature factory is associated with the seat family, an "engine" feature factory is associated with the engine family, a "fuel economy" attribute factory is associated with fuel economy, and a "price" attribute factory is associated with price.

After creating a normalized data model for a product, operation 216 adds the normalized data model for a product to normalized data model 108. The normalized data model 108 contains a collection of normalized product data models. In operation 218, if product configuration repository 116 contains product configurations that have not been normalized, normalized model generation process 200 returns to operation 214. If all product configurations stored in product configuration repository 116 have been normalized, normalized model generation process 200 proceeds to operation 220.

Figure 4:
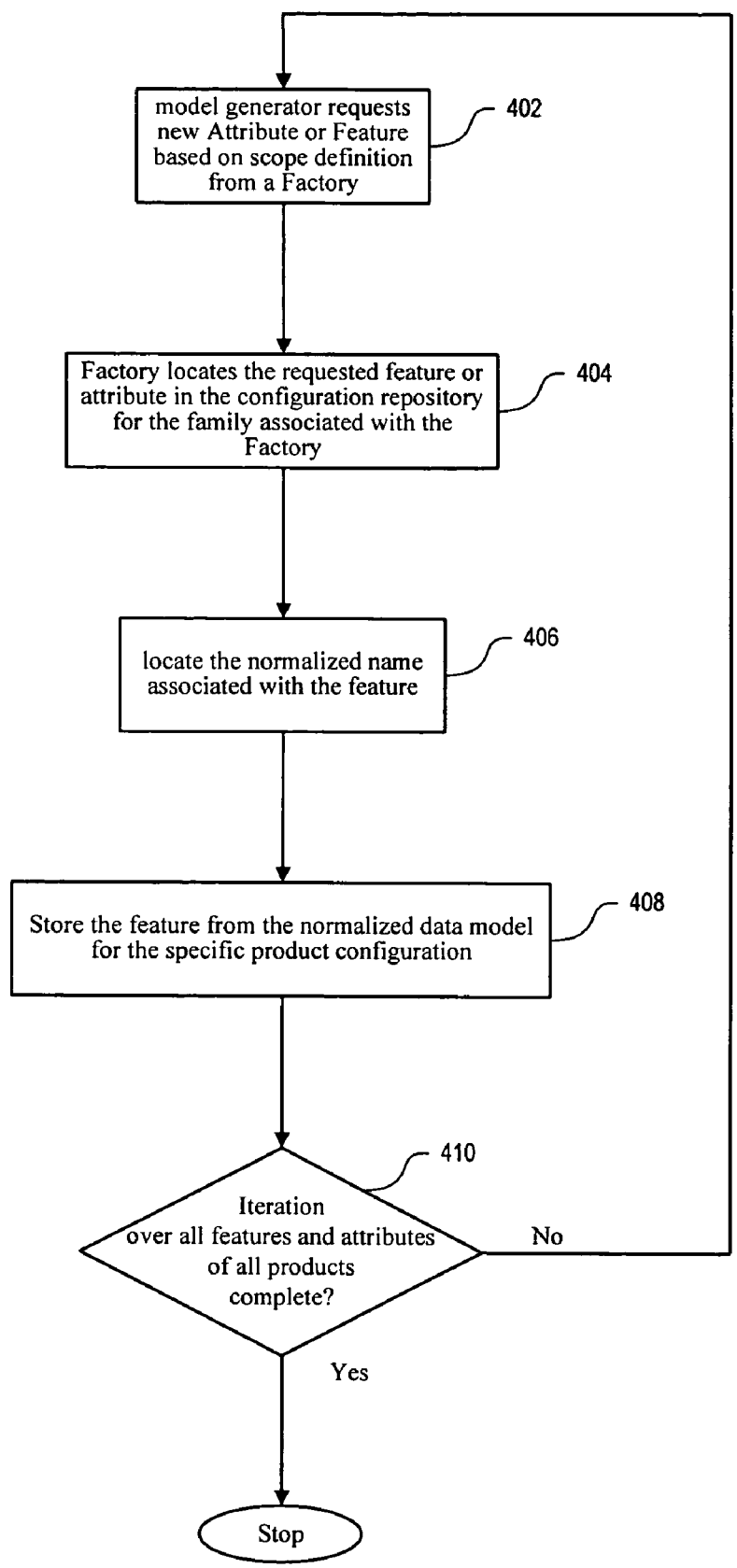
FIG. 4 depicts a feature and attribute assignment process.

FIGS. 3 and 4 depict in greater detail the interaction between the product configuration repository 116 and the factories 114 that occurs in operations 214, 216, 218, and 220. As each product configuration instance, such as product configuration instance 312, is recursively generated from data stored in the product configuration repository 116, the feature and attribute assignment process 400 allows the model generator 106 to request feature factories 308 for each family to locate each feature corresponding to the family associated with the factory, retrieve the normalized data from the mapping file 112 for each located feature, and store the normalized data in a normalized data model. The stored normalized data is correlated with the product configured with the normalized feature. For each product represented by stored data in the product configuration repository 116, the feature and attribute assignment process 400 also allows the model generator 106 to request attribute factories 310 for each product attribute to locate each attribute corresponding to the attribute associated with the factory, retrieve the normalized data from the mapping file 112 for each located attribute, and store the attribute in the normalized data model 108. The stored attribute data is correlated with the product associated with the attribute. In an alternative embodiment, the price attribute factory accesses the pricing engine 120 directly to determine the price of each product configuration stored in product configuration repository 116.

To begin building the normalized data model for a product, in operation 402 the model generator 106 requests a specific factory to locate all features or attributes in the family associated with the requested factory. The normalized data model scope definition file 118 guides the model generator 106 in determining which features and attributes to include in the normalized data model 108. In operation 404, the requested factory locates the requested feature or attribute in the product being configured from data stored in product configuration repository 116 for the family or attribute associated with the factory. In operation 406, the feature factory locates the normalized name of the located feature associated with the feature, and operation 408 stores the normalized data in the normalized data model 108. Each normalized feature and attribute remains correlated with a specific product configuration. If process 400 has iterated over every feature and attribute of every product configuration represented in the product configuration repository 116, the process 400 stops. Otherwise, process 400 returns to operation 402 to locate new features and attributes.

Figure 5:
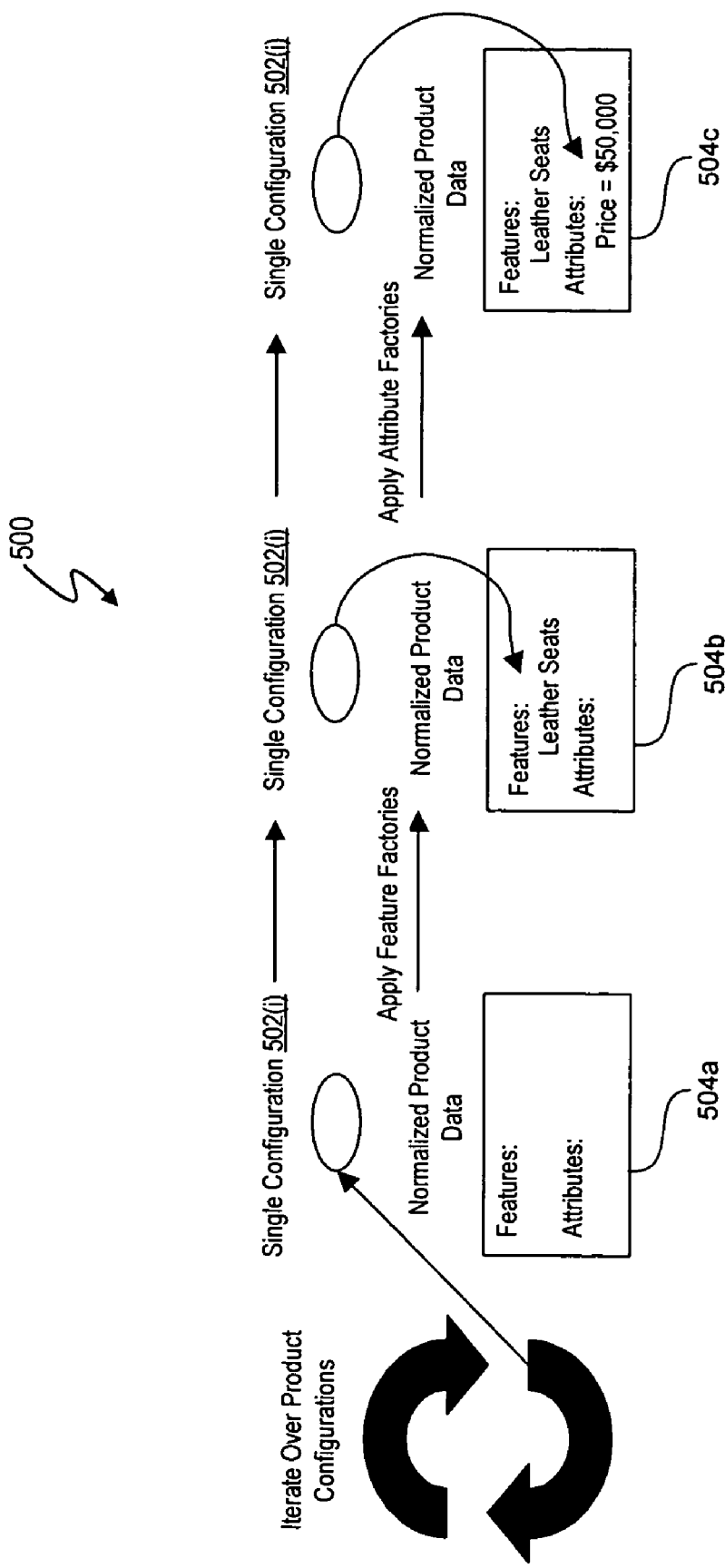
FIG. 5 depicts an example summary of the feature and attribute assignment process of FIG. 4.

FIG. 5 depicts an example summary of the feature and attribute assignment process 400. The feature and attribute assignment process 400 iterates over every feature and attribute of every product configuration stored in the product configuration repository 116. Thus, the normalized data model 108 contains a complete, normalized representation of each product configuration stored in product configuration repository 116. Each single product configuration 502($i$) includes features and attributes, where $0 \leq i \leq N$ and N represents the total number of product configurations in product configuration repository 116. Initially, the normalized data 504$a$ for a product is empty. Product configuration instance 312 represents one embodiment of a single product configuration 502($i$). The model generation system 100 applies a feature factory to locate a feature. For example, to locate all seats, normalized model generation system 100 applies a seat factory. In accordance with operation 404, the seat factory locates any seat data in the product configuration 502($i$), such as "front low back bucket leather seats", and, in accordance with operation 406, the seat factory accesses the mapping file 112 and determines that the specific feature "front low back bucket leather seats" maps to the normalized feature "leather seats". In accordance with operation 408, the seat factory stores the normalized data "leather seats" 504$b$ in the product configuration repository 116, which retains the association with product configuration 502($i$). The model generation system 100 also applies an attribute factory to locate an attribute. For example, to locate the price of product configuration 502($i$), the model generator 106 applies a price attribute factory to obtain the price of product configuration 502($i$). The price attribute factory stores the price, such as price=$30,000, in the portion of normalized data model 116 associated with product configuration 502($i$). The process 400 repeats until the normalized data model 108 contains normalized feature data and attribute data for each feature and each attribute of each product configuration stored in product configuration repository 116.

Returning to FIGS. 1 and 2, upon completion of the normalized data model 108, the data in normalized data model 108 can be processed to allow the normalized data model 108 to efficiently represent the normalized product configurations and allow an application, such as contextual configuration system 110, to efficiently use normalized data model 108. For example, after normalization, the normalized data model 108 may include duplicate normalized product configurations or other data representation duplications and inefficiencies. Additionally, different data structures are more suitable for different kinds of access and processing. Thus, it may be desirable to transform all or part of the normalized data model 108 data structure into another data structure. The optional operation 220 processes the normalized data model 108 to optimize the normalized data model 108 by, for example, reducing the total number of data items contained in normalized data model 108 by eliminating duplication of data and/or optimizing the data structure of normalized data model 108.

At runtime, the contextual configuration system 110 can provide the current calculation of the aggregation of an attribute for a set of products. For example, contextual configuration system 110 can provide the maximum price of vehicles for the set of all 4×4 products under consideration by the end-user of contextual configuration system 110. These aggregation calculations result from the application of attribute aggregators in operation 222. Attribute aggregators implement an aggregator interface and generally provide a sort order for the attribute values being aggregated. These aggregators enter into the model generation process when an aggregation is declared to be pre-computed. In one embodiment, pre-computed aggregations have their values calculated to a predetermined depth of constraint selections (e.g. all sets of three feature selections) and are stored in the normalized data model 108 to be loaded at runtime of the beneficiary application, such as normalized model generation system 100. A selection of a feature in a contextual configuration system 110 represents a constraint on the available space of aggregated product attributes. For example, if the minimum price (an aggregated attribute) of a product is $22,500, then constraining the available space of values by looking at products that have a particular feature, such as a V6 engine (i.e. selecting the V6 Feature), changes the aggregated minimum price of the space of available products to $27,000. Product attribute values can be used to derive aggregated conclusions about a set of products, such as the minimum or maximum value of the set. These aggregations can be used to build the 'grid' displays described in the Miller Application. By pre-computing aggregations in the model, the contextual configuration system 110 can gain significant runtime performance advantages. In-memory representation of the normalized configuration data model can then be serialized to a memory as, for example, a file to be loaded for runtime use in a deployment as indicated in operation 224.

Figure 6:
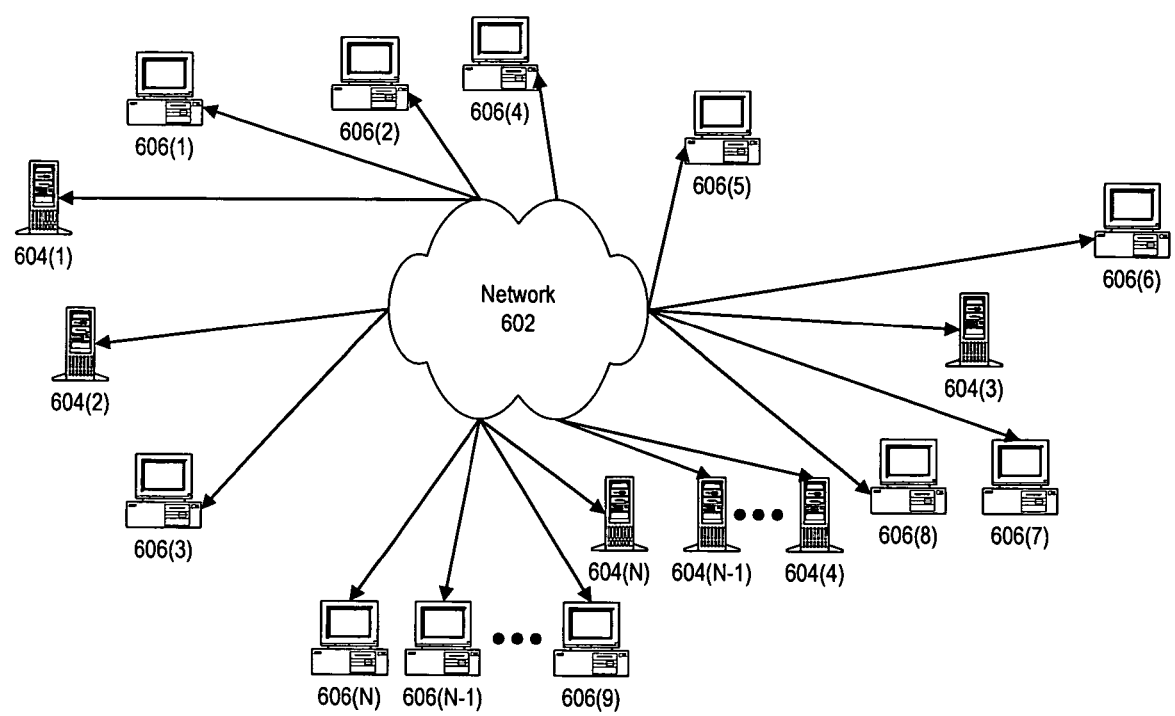
FIG. 6 depicts a block diagram of a network environment in which the system of FIG. 1 and process of FIG. 2 can be implemented.

FIG. 6 is a block diagram illustrating a network environment in which a normalized model generation system and process may be practiced. Network 602 (e.g. a private wide area network (WAN) or the Internet) includes a number of networked server computer systems 604(1)-(N) that are accessible by client computer systems 606(1)-(N), where N is the number of server computer systems connected to the network. Communication between client computer systems 606(1)-(N) and server computer systems 604(1)-(N) typically occurs over a network, such as a public switched telephone network over asynchronous digital subscriber line (ADSL) telephone lines or high-bandwidth trunks, for example communications channels providing T1 or OC3 service. Client computer systems 606(1)-(N) typically access server computer systems 604(1)-(N) through a service provider, such as an internet service provider ("ISP") by executing application specific software, commonly referred to as a browser, on one of client computer systems 606(1)-(N).

Client computer systems 606(1)-(N) and/or server computer systems 604(1)-(N) may be, for example, computer systems of any appropriate design, including a mainframe, a mini-computer, a personal computer system including notebook computers, a wireless, mobile computing device (including personal digital assistants). These computer systems are typically information handling systems, which are designed to provide computing power to one or more users, either locally or remotely. Such a computer system may also include one or a plurality of input/output ("I/O") devices coupled to the system processor to perform specialized functions. Mass storage devices such as hard disks, compact disk ("CD") drives, digital versatile disk ("DVD") drives, and magneto-optical drives may also be provided, either as an integrated or peripheral device. One such example computer system is shown in detail in FIG. 7.

Figure 7:
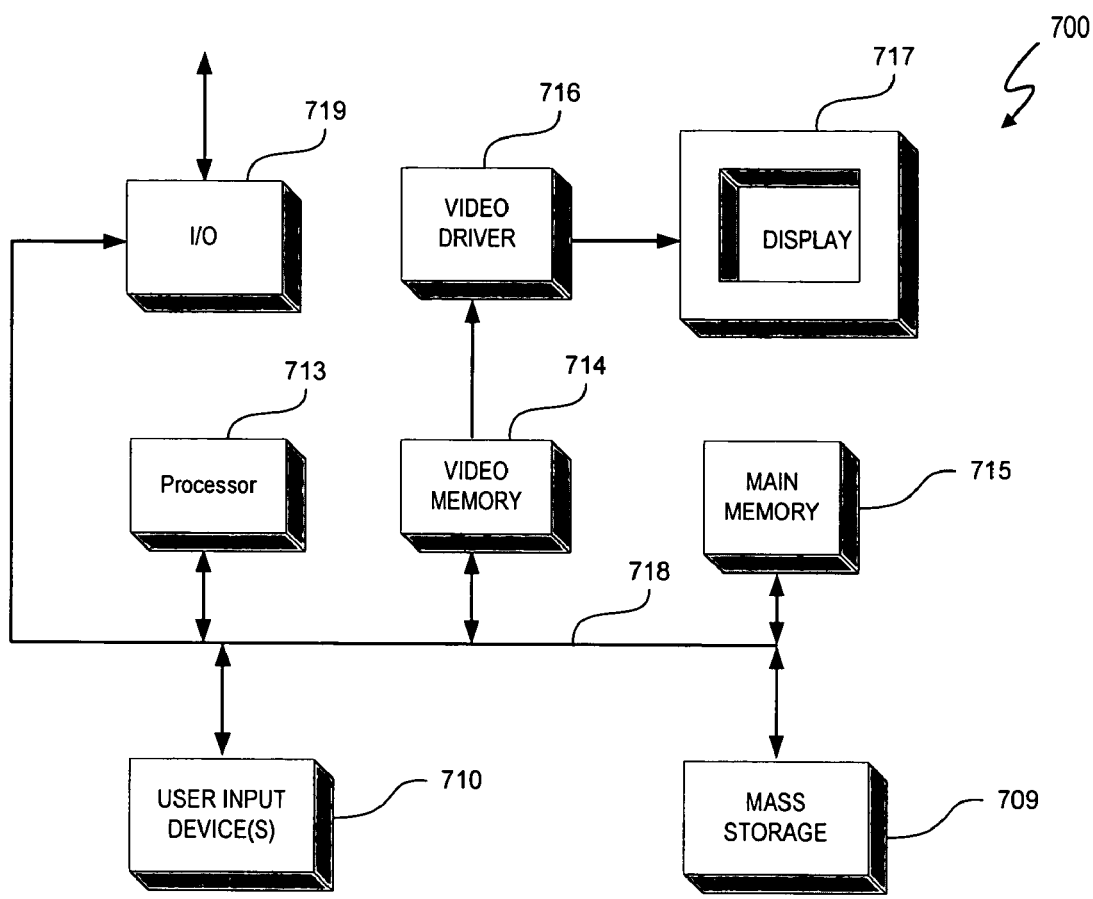
FIG. 7 depicts an example computer system.

Embodiments of the normalized model generation system and process can be implemented on a computer system such as a general-purpose computer 700 illustrated in FIG. 7. Input user device(s) 710, such as a keyboard and/or mouse, are coupled to a bi-directional system bus 718. The input user device(s) 710 are for introducing user input to the computer system and communicating that user input to processor 713. The computer system of FIG. 7 generally also includes a video memory 714, main memory 715 and mass storage 709, all coupled to bi-directional system bus 718 along with input user device(s) 710 and processor 713. The mass storage 709 may include both fixed and removable media, such as other available mass storage technology. Bus 718 may contain, for example, 32 address lines for addressing video memory 714 or main memory 715. The system bus 718 also includes, for example, an n-bit data bus for transferring DATA between and among the components, such as CPU 709, main memory 715, video memory 714 and mass storage 709, where "n" is, for example, 32 or 64. Alternatively, multiplex data/address lines may be used instead of separate data and address lines.

I/O device(s) 719 may provide connections to peripheral devices, such as a printer, and may also provide a direct connection to a remote server computer systems via a telephone link or to the Internet via an ISP. I/O device(s) 719 may also include a network interface device to provide a direct connection to a remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 709 until loaded into main memory 715 for execution. Computer programs may also be in the form of electronic signals modulated in accordance with the computer program and data communication technology when transferred via a network.

The processor 713, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 715 is comprised of dynamic random access memory (DRAM). Video memory 714 is a dual-ported video random access memory. One port of the video memory 714 is coupled to video amplifier 716. The video amplifier 716 is used to drive the display 717. Video amplifier 716 is well known in the art and may be implemented by any suitable means. This circuitry converts pixel DATA stored in video memory 714 to a raster signal suitable for use by display 717. Display 717 is a type of monitor suitable for displaying graphic images.

The computer system described above is for purposes of example only. The normalized model generation system and process may be implemented in any type of computer system or programming or processing environment. It is contemplated that the normalized model generation system and process might be run on a stand-alone computer system, such as the one described above. The normalized model generation system and process might also be run from a server computer systems system that can be accessed by a plurality of client computer systems interconnected over an intranet network. Finally, the normalized model generation system and process may be run from a server computer system that is accessible to clients over the Internet.

Many embodiments of the present invention have application to a wide range of industries and products including the following: computer hardware and software manufacturing and sales, professional services, financial services, automotive sales and manufacturing, telecommunications sales and manufacturing, medical and pharmaceutical sales and manufacturing, and construction industries.

Although the present invention has been described in detail, it should be understood that various changes, substitutions and alterations can be made hereto without departing from the spirit and scope of the invention as defined by the appended claims. For example, the particular order in which factories are applied to locate, normalize, and store feature and attribute data is a matter of design choice.

What is claimed is:

1. A method for generating a normalized configuration model, the method comprising:
    utilizing at least portions of a normalized model generation system to perform:
        generating product configuration instances from one or more product configuration models that include non-normalized feature references;
        identifying non-normalized feature references included in one or more of the product configuration instances;
        accessing a mapping file, wherein the mapping file includes a map of specific product feature references to normalized feature references;
        locating normalized feature references that correlate with non-normalized feature references included in the generated product configuration instances;
        replacing non-normalized feature references with correlating normalized feature references in accordance with the mapping file; and
        generating a normalized configuration model corresponding to the generated product configuration instances using the normalized feature references replacements, wherein the normalized configuration model is configured for use with a configuration system which presents the normalized feature references to a user of the configuration system to allow the user to configure a product using the normalized feature references.

2. The method of claim 1 wherein the normalized configuration model includes a complete representation of all generated product configuration instances.

3. The method of claim 1 wherein locating normalized feature references further comprises:
    iterating over all product configuration instances on a feature-by-feature basis.

4. The method of claim 1 further comprising:
    providing access to the normalized configuration model to a contextual configuration engine.

5. The method of claim 1 further comprising:
    storing the normalized configuration model in system memory for run-time access.

6. The method of claim 1 further comprising:
    optimizing the normalized configuration model for run-time data retrieval.

7. The method of claim 6 wherein optimizing the normalized configuration model comprises:
    removing data duplications while maintaining a complete, normalized representation of the generated product configuration instances.

8. The method of claim 1 wherein the product is a vehicle.

9. A data processing system for generating a normalized configuration model comprises:
    a processor; and
    a memory, coupled to the processor, the memory having code encoded therein and executable by the processor to:
    generate product configuration instances from one or more product configuration models that include non-normalized feature references;
    identify non-normalized feature references included in one or more of the product configuration instances;
    access a mapping file, wherein the mapping file includes a map of specific product feature references to normalized feature references;
    locate normalized feature references that correlate with non-normalized feature references included in the generated product configuration instances;
    replace non-normalized feature references with correlating normalized feature references in accordance with the mapping file; and
    generate a normalized configuration model corresponding to the generated product configuration instances using the normalized feature references replacements, wherein the normalized configuration model is configured for use with a configuration system which presents the normalized feature references to a user of the configuration system to allow the user to configure a product using the normalized feature references.

10. The data processing system of claim 9 wherein the normalized configuration model includes a complete representation of all generated product configuration instances.

11. The data processing system of claim 9 wherein the code to locate normalized feature references comprises code to:
    iterate over all product configuration instances on a feature-by-feature basis.

12. The data processing system of claim 9 wherein the memory further comprises code encoded therein to cause the processor to:
    provide access to the normalized configuration model to a contextual configuration engine.

13. The data processing system of claim 9 wherein the memory further comprises code encoded therein to cause the processor to:
    store the normalized configuration model in system memory for run-time access.

14. The data processing system of claim 9 wherein the memory further comprises code encoded therein to cause the processor to:
    optimize the normalized configuration model for run-time data retrieval.

15. The data processing system of claim 14 wherein the code to optimize the normalized configuration model comprises code to:

remove data duplications while maintaining a complete, normalized representation of the generated product configuration instances.

16. The data processing system of claim 9 wherein the product is a vehicle.

17. A computer readable medium comprising data encoded therein for generating a normalized configuration model, wherein the data comprises code executable by a processor to:
generate product configuration instances from one or more product configuration models that include non-normalized feature references;
identify non-normalized feature references included in one or more of the product configuration instances;
access a mapping file, wherein the mapping file includes a map of specific product feature references to normalized feature references;
locate normalized feature references that correlate with non-normalized feature references included in the generated product configuration instances;
replace non-normalized feature references with correlating normalized feature references in accordance with the mapping file; and
generate a normalized configuration model corresponding to the generated product configuration instances using the normalized feature references replacements, wherein the normalized configuration model is configured for use with a configuration system which presents the normalized feature references to a user of the configuration system to allow the user to configure a product using the normalized feature references.

18. The computer readable medium of claim 17 wherein the normalized configuration model includes a complete representation of all generated product configuration instances.

19. The computer readable medium of claim 17 wherein the code to locate normalized feature references comprises code to:
iterate over all product configuration instances on a feature-by-feature basis.

20. The computer readable medium of claim 17 wherein the data further comprises code encoded therein to cause the processor to:
provide access to the normalized configuration model to a contextual configuration engine.

21. The computer readable medium of claim 17 wherein the data further comprises code encoded therein to cause the processor to:
store the normalized configuration model in system memory for run-time access.

22. The computer readable medium of claim 17 wherein the data further comprises code encoded therein to cause the processor to:
optimize the normalized configuration model for run-time data retrieval.

23. The computer readable medium of claim 22 wherein the code to optimize the normalized configuration model comprises code to:
remove data duplications while maintaining a complete, normalized representation of the generated product configuration instances.

24. The computer readable medium of claim 17 wherein the product is a vehicle.

25. A system for generating a normalized configuration data model comprising:
means for generating product configuration instances from one or more product configuration models that include non-normalized feature references;
means for identifying non-normalized feature references included in one or more of the product configuration instances;
means for accessing a mapping file, wherein the mapping file includes a map of specific product feature references to normalized feature references;
means for locating normalized feature references that correlate with non-normalized feature references included in the generated product configuration instances;
means for replacing non-normalized feature references with correlating normalized feature references in accordance with the mapping file; and
means for generating a normalized configuration model corresponding to the generated product configuration instances using the normalized feature references replacements, wherein the normalized configuration model is configured for use with a configuration system which presents the normalized feature references to a user of the configuration system to allow the user to configure a product using the normalized feature references.

26. The method of claim 1 further comprising:
mapping specific product feature references to normalized feature references into a mapping file.

27. The data processing system of claim 9 wherein the memory includes further code encoded therein and executable by the processor to:
map specific product feature references to normalized feature references into a mapping file.

28. The computer readable medium of claim 17 wherein the data comprises further code executable by the processor to:
map specific product feature references to normalized feature references into a mapping file.

29. The system of claim 25 further comprising:
means for mapping specific product feature references to normalized feature references into a mapping file.

\* \* \* \* \*